United States Patent [19]

Bond

[11] 4,334,567
[45] Jun. 15, 1982

[54] TIRES

[75] Inventor: Robert Bond, Lichfield, England

[73] Assignee: Dunlop Limited, London, England

[21] Appl. No.: 134,091

[22] Filed: Mar. 26, 1980

Related U.S. Application Data

[63] Continuation-in-part of Ser. No. 949,276, Oct. 6, 1978, abandoned.

[30] Foreign Application Priority Data

Oct. 8, 1977 [GB] United Kingdom ............... 41979/77

[51] Int. Cl.³ ............................................. B60C 11/00
[52] U.S. Cl. ................................. 152/209 R; 152/374; 156/128 T; 526/340
[58] Field of Search ........................ 526/173, 181, 340; 525/314; 152/209 R, 330 R, 357 R, 374; 156/128 T, 110 R

[56] References Cited

U.S. PATENT DOCUMENTS

| | | | |
|---|---|---|---|
| 2,975,160 | 3/1961 | Zelinski | 526/173 X |
| 3,251,905 | 5/1966 | Zelinski | 526/173 X |
| 3,331,821 | 7/1967 | Strobel | 526/340 X |
| 3,364,965 | 1/1968 | Oubridge | 152/209 R |
| 3,402,159 | 9/1968 | Hsieh | 526/340 X |
| 3,580,895 | 5/1971 | Onishi et al. | 526/340 X |
| 3,795,651 | 3/1974 | Yamaguchi et al. | 152/330 R X |
| 3,830,275 | 8/1974 | Russell | 152/357 R |
| 3,944,528 | 3/1976 | Loveless | 526/340 X |
| 4,121,031 | 10/1978 | Minekawa et al. | 526/340 X |
| 4,224,197 | 9/1980 | Ueda et al. | 152/209 R X |

OTHER PUBLICATIONS

Peterson, Jr. et al. "Tread Compound Effects in Tire Traction" in *The Physics of Tire Traction* Edited by Hayes et al., p. 229, Plenum Press, Oct. 1974, 1973.

*Primary Examiner*—John E. Kittle
*Assistant Examiner*—Thomas Bokan
*Attorney, Agent, or Firm*—Stevens, Davis, Miller & Mosher

[57] ABSTRACT

A tire whose tread comprises as elastomer a styrene-butadiene or a styrene-isoprene co-polymer having a glass transition temperature above minus 50° C., said composition having a rebound resilience of 55% or more.

The glass transition temperature is preferably between minus 40° C. and minus 25° C. and the rebound resilience is preferably between 60% and 70%.

12 Claims, 2 Drawing Figures

TIRES

This application is a continuation-in-part of copending application Ser. No. 949,276 filed Oct. 6, 1978, now abandoned.

This invention relates to elastomer compositions and to their use in tires, in particular to the ground-contacting tread portion of tires.

Two general principles are currently accepted in the tire industry when considering tire treads and their grip performance in wet conditions. These are:

(i) the wet grip performance of a tire tread composition (compound) is a function of the rebound resilience of the composition, the lower the resilience value the better the wet grip performance; and (ii) the wet grip performance of a polymer suitable for a tire tread is a function of $T_g$, the glass transition temperature of the polymer, and the higher the $T_g$ the better the wet grip performance.

From these two currently accepted principles it is clear that for good wet properties the tread compound should be selected to have a relatively low rebound resilience and the polymer used should have a relatively high $T_g$.

Currently tire manufacturers generally use tread compounds made from polymer blends, for example a styrene-butadiene copolymer/polybutadiene blend applying the above requirements. Two general classes of tread compounds have emerged:

(a) those giving high wet grip performance combined with high heat build-up characteristics and relatively high rolling resistance, and having $T_g$ above minus 55° C.; and (b) those giving relatively low wet grip performance combined with low heat build-up characteristics and relatively low rolling resistance, and having a $T_g$ below minus 65° C. These two classes are referred to below as Class (a) and Class (b) compounds respectively.

The inventor has now found that improved tread compounds are ones containing an elastomer of a relatively high $T_g$ while also having a relatively high rebound resilience value. These new tread compounds have the advantage of good wet grip performance and improved heat build-up/rolling resistance characteristics.

Accordingly, in a first aspect the present invention provides a tire whose tread is formed of an elastomer composition containing as elastomer a styrene-butadiene or a styrene-isoprene copolymer having a glass transition temperature (as hereinafter defined) above minus 50° C., said composition having a rebound resilience (as hereinafter defined) of 55% or more.

In a second aspect the invention provides an elastomer composition containing as elastomer a styrene-butadiene or a styrene-isoprene copolymer having a glass transition temperature (as hereinbefore defined) above minus 50° C., said composition having a rebound resilience (as hereinbefore defined) of 55% or more.

The rebound resilience referred to herein is that measured using the Dunlop Pendulum at 50° C. according to B.S. 903/1950. The elastomer compositions of this invention preferably are ones having a rebound resilience of 60% or more, especially in the range from 60% to 95%, and more especially 60% to 75%.

Glass transition temperature ($T_g$) can be measured by various known methods and in this specification it is defined as the temperature at which there is a change in the shape of a curve of volume plotted against temperature as measured by dilatometry. In the glassy state there is a lower volume coefficient of expansion than in the rubbery state, thus producing a change in shape of the curve.

The polymers used in the elastomer compositions and in the treads of the tires of this invention are preferably ones having a $T_g$ in the range from minus 45° C. to minus 20° C., especially in the range from minus 40° C. to minus 25° C.

It has been found according to the invention that polymers having a $T_g$ (as hereinbefore defined) above minus 50° C. and which provide elastomer compositions having a rebound resilience of 55% or more are styrene-butadiene copolymers having a styrene content of not more than 40%, especially in the range 20% to 40% by weight. These copolymers are normally formed by the interpolymerisation of styrene and butadiene without the interaction of any other polymerisable monomer. Preferred copolymers are ones in which a major portion (for example from 50% to 80% and especially from 60 to 75%) of the butadiene has polymerised at the butadiene 1,2 positions. In the copolymers isoprene can be used instead of butadiene.

Good results have been obtained using copolymers having styrene blocks and/or butadiene blocks at the ends of the copolymer molecules; for example styrene blocks which comprise from 5 to 50%, especially from 15 to 25% by weight of the copolymer, or butadiene blocks which comprise 5% to 15% by weight of the copolymer.

For the preparation of the copolymers the technique of solution copolymerisation can be applied, in which the monomers (e.g. styrene and butadiene) are brought into a non-polar solvent, after which copolymerisation is effected upon addition of a lithiumhydrocarbon compound. In addition a modifier can be added to obtain an increased content of vinyl structure (1,2 structure) of the butadiene part of the copolymer.

As structure modifier can be used ethers or tertiary amines, for example diethyleneglycol dimethylether, triethylamine and tetramethyldiethylene amine.

Figure 1:
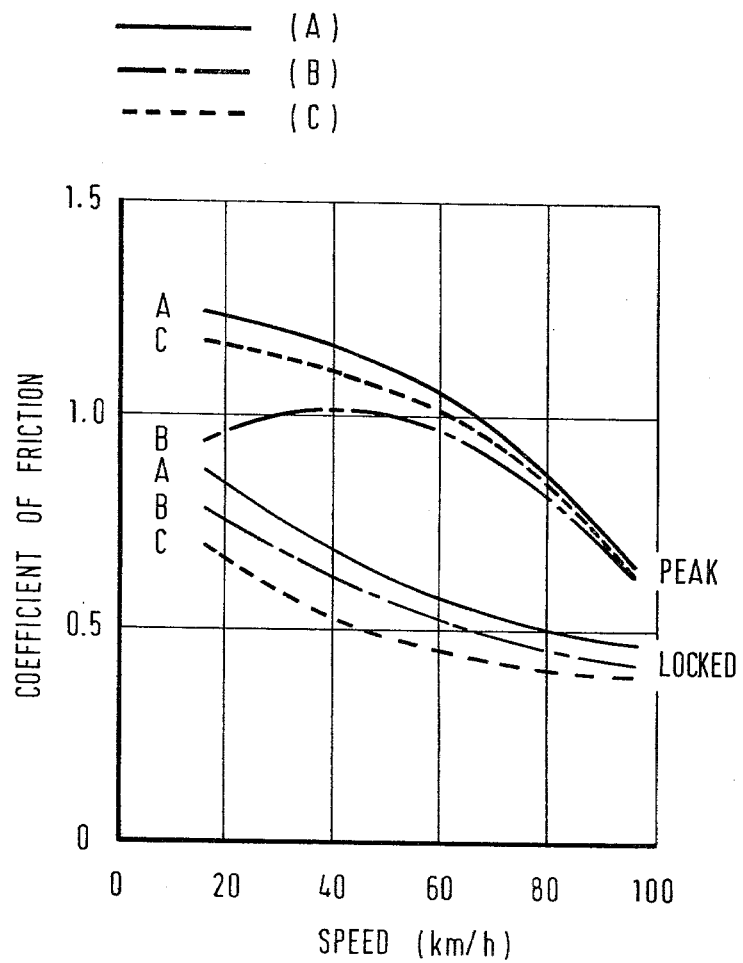
FIG. 1 is a graph showing the wet grip characteristics of tires having the tread composition of the following Examples 2, 3, and 4.

The invention is illustrated by the following Examples in which, unless stated otherwise, the proportions of ingredients in the compositions is given in parts by weight.

The compositions of Examples 1 to 4 include as their polymer ingredient solution SBR copolymers referred to as Copolymer P, A, B and C respectively which are styrene-butadiene copolymers. Copolymer B has part of its styrene in the form of end blocks which amount to 19.5% by weight of the copolymer, and Copolymer C has part of its butadiene in the form of end blocks which amount to 8% by weight of the copolymer.

For the Copolymers A, B, C and P the following polymerisation recipes were used, the quantities shown being parts by weight.

|   | A | B | C | P |
|---|---|---|---|---|
| 1. Cyclohexane | 12,000 | 12,000 | 12,000 | 12,000 |
| 2. Styrene | 460 | 716 | 384 | 460 |
| 3. Butadiene | 1,540 | 1,284 | 1,616 | 1,540 |
| 4. Diglyme (diethylene glycol dimethylether) | 0.140 | 0.140 | 0.140 | 0.126 |
| 5. Sec.butyllithium (initiator) | 0.450 | 0.450 | 0.450 | 0.430 |

The four copolymers were made as follows:

COPOLYMER A

The compounds No. 1, 2, 3 and 4 were charged in successive order to a 20 liters stirred reactor and heated to 50 degrees C., after which the polymerisation reaction was initiated by addition of the initiator. Polymerisation of the monomers to complete conversion was obtained in 3 hours at a temperature kept between 50 and 60 degrees C.

Next 6 parts by weight of 2,6 di-tert, butylparacresol were added as a stabiliser, the polymer was separated from the solvent by steam coagulation and finally dried in an air oven at 80 degrees C. for 2 hours. The resulting copolymer, analyzed by GPC, showed a molecular weight of 440,000, based on polystyrene calibration. The bound styrene content was 22.8 (% by weight) (by infra-red analysis).

COPOLYMER B

A 10 liters reactor was charged with 6000 parts of the cyclohexane and 333 parts of the styrene, and the resulting mixture was heated to 50 degrees C., after which the 0.45 part of initiator was added. The styrene was polymerised to complete conversion at 50–60 degrees C. during 30 minutes, the molecular weight of the polystyrene being 50,000. Then the polystyrene solution was transferred to a 25 liters reactor charged with 6000 parts of cyclohexane and 0.140 part diglyme. The polystyrene block polymer was copolymerised with the butadiene and the balance of the styrene (383 parts) at 50–60 degrees C. during 3 hours. The molecular weight of the block copolymer was found by GPC to be 405,000. The bound styrene content was 36.5% by weight.

COPOLYMER C

A 10 liters reactor was charged with 6000 parts of cyclohexane, 166.5 parts of butadiene and 0.140 part of diglyme. The contents were brought to 50 degrees C. after which the initiator (0.450 part) was added. The butadiene was polymerised to complete conversion in 30 minutes at 50–60 degrees C. The molecular weight of the polybutadiene was 25,000. Then the polybutadiene was transferred to a second 25 liter reactor, which prior to the transfer had been charged with 6000 parts of cyclohexane, 384 parts of styrene and 1449.5 parts of butadiene. The polybutadiene was copolymerised with the butadiene and styrene at 50–60 degrees C. during 3 hours GPC. The molecular weight of the blockcopolymer (GPC analysis) was 490,000 and its bound styrene content was 20.2% by weight.

COPOLYMER P

This copolymer was prepared in an analogous manner to Copolymer A except that 0.126 part of diglyme and 0.430 part of the initiator were charged to the reactor instead of the amounts specified for Copolymer A. The resulting copolymer had a molecular weight of 475,000 (GPC analysis) and a bound styrene content of 22.7% by weight.

The molecular weights of copolymers referred to in this specification are determined as follows.

There is used a gel permeation chromatograph (Model ALC 201) obtained from Waters Associates Inc. Mass., U.S.A.. The instrument is fitted with:

1. a column assembly consisting of four double columns (length 60 cm, outer-diameter 9.5 mm) containing Styragel of pore sizes of $1 \times 10^5$, $3 \times 10^4$, $1 \times 10^4$ and $3 \times 10^3$ Angstrom units, respectively; and 2. a differential refractometer detector ex Waters Associates Inc.

The polymers to be analysed are dissolved in tetrahydrofuran in a concentration of 250 mg/100 ml. and pumped through the columns at a rate of 0.7 ml per minute. The instrument is calibrated using polystyrene standards, obtained from Pressure Chemicals, U.S.A. covering relative molecular weights of 10,300, 20,400, 51,000, and 411,000 respectively.

The salient chemical features of the four copolymers P, A, B and C and their $T_g$ values are as follows:

|   | Copolymer P | Copolymer A | Copolymer B | Copolymer C |
|---|---|---|---|---|
| Styrene content (%) | 22.7 | 22.8 | 36.5 | 20.2 |
| Vinyl group content (%) | 70 | 66 | 70 | 56 |
| Glass transition (°C.) temperature ($T_g$) | minus 34 | minus 34 | minus 28 | minus 36 |

Copolymers A, B, C and P are characterised by having a linear chain structure, a high proportion of vinyl group content and an uneven distribution of styrene and butadiene throughout the molecular chain (ignoring any styrene and/or butadiene (or isoprene) blocks that might be at the ends of the molecules).

That portion of the copolymers in which the butadiene has reacted by "head-to-tail" 1,4 polymerisation has been found largely to have a trans configuration.

Four elastomer compositions of the invention, suitable for use as tire treads, have been obtained by blending together the following ingredients and vulcanising for 40 minutes at 140° C. in a steam autoclave.

The amounts of the ingredients used and physical properties of the elastomer compositions are given below.

| Ingredients | Example No. 1 | 2 | 3 | 4 |
|---|---|---|---|---|
| Copolymer P | 100 |  |  |  |
| Copolymer A |  | 100 |  |  |
| Copolymer B |  |  | 100 |  |
| Copolymer C |  |  |  | 100 |
| Sulphur | 1.75 | 1.75 | 1.5 | 1.83 |
| N.O.B.S. Santocure MOR (Monsanto Ltd.) Accelerator | 1.00 | 1.00 | 0.86 | 1.05 |
| N 375 carbon black Arrconox GP | 50.00 | 50.00 | 50.00 | 50.00 |
| Antioxidant | 2.00 | 2.00 | 2.00 | 2.00 |
| Zinc oxide | 3.00 | 3.00 | 3.00 | 3.00 |
| Stearic acid | 1.00 | 1.00 | 1.00 | 1.00 |
| Mechanical Properties |  |  |  |  |
| Tensile strength (M Pa) | 8.0 | 22.2 | 18.1 | 12.1 |
| Stress @ 300% (M Pa) | — | 11.4 | 14.0 | — |
| Elongation @ break (%) | 235 | 475 | 385 | 280 |
| Hardness (I.R.H.D.) | 69.8 | 70.3 | 94.8 | 74.1 |

-continued

| Ingredients | Example No. | | | |
|---|---|---|---|---|
| | 1 | 2 | 3 | 4 |
| Resilience at 50° C. (%) | 66.3 | 60.5 | 42.2 | 65.5 |

By comparison a Class (a) tread compound typically has a hardness of 67 IRHD and a resilience of 51% at 50° C., and a Class (b) compound has a hardness of 67 IRHD and a resilience of 71% at 50° C.

Under rolling conditions at constant load a major component to the power consumption of the tread compound of the tire is proportional to the compound's loss modulus divided by its complex modulus squared $(E'')/(E^{*2})$.

Therefore this can be used as a measure of the tread compound's heat build-up/rolling resistance performance—the lower the value the better the heat build-up/rolling resistance performance.

Typical figures for known existing types of compounds are:

| | Temperature | $\frac{E''}{E^{*2}}$ MP a$^{-1}$ |
|---|---|---|
| Compound Class (a) | 50° C. | 0.0260 |
| | 80° C. | 0.0241 |
| | 100° C. | 0.0210 |
| Compound Class (b) | 50° C. | 0.0170 |
| | 80° C. | 0.0160 |
| | 100° C. | 0.0170 |

The power loss values for the tire tread compositions of the Examples are given in the Table below. The various values have been given reference numbers 1 to 4 whose means and units are as follows:

| | Unit |
|---|---|
| 1. Elastic modulus (E') | M Pa |
| 2. Loss modulus (E'') | M Pa |
| 3. Loss factor (E''/E') | |
| 4. (E''/E*)$^2$ | M Pa$^{-1}$ |

The results for the four values, each measured at 50°, 80° and 100° C., are given below.

| | 50° C. | 80° C. | 100° C. |
|---|---|---|---|
| Example 1 | | | |
| 1 | 7.44 | 6.68 | 6.46 |
| 2 | 0.69 | 0.57 | 0.51 |
| 3 | 0.093 | 0.085 | 0.079 |
| 4 | 0.0123 | 0.0127 | 0.0121 |
| Example 2 | | | |
| 1 | 7.14 | 6.16 | 5.85 |
| 2 | 0.86 | 0.62 | 0.52 |
| 3 | 0.120 | 0.100 | 0.089 |
| 4 | 0.0166 | 0.0161 | 0.0152 |
| Example 3 | | | |
| 1 | 19.19 | 13.22 | 8.60 |
| 2 | 3.83 | 2.73 | 1.80 |
| 3 | 0.199 | 0.206 | 0.209 |
| 4 | 0.0100 | 0.0150 | 0.0233 |
| Example 4 | | | |
| 1 | 8.43 | 7.82 | 7.65 |
| 2 | 0.81 | 0.62 | 0.52 |
| 3 | 0.096 | 0.079 | 0.068 |
| 4 | 0.0113 | 0.0101 | 0.0089 |

It can be seen that the $E''/E^{*2}$ values for the compositions of the Examples are all significantly lower than those for both of the known classes of compounds. The compositions of Examples 2,3 and 4 have been tested to assess their wet grip and rolling resistance properties on a road surface. Each of those three compositions was used as the tread compound of model tires of size 2.25-8 (dimensions in inches). These model tires were subjected to two tests as follows.

Grip on a wet Delugrip road surface (Delugrip is a Trade Mark) was measured using the variable speed internal drum machine (VSIDM) described in a paper by G. Lees and A. R. Williams in Journal of the Institute of the Rubber Industry, Vol. 8, No. 3, June 1974. Measurements of the wet grip were made for both peak and locked wheel friction at speeds of 16,32,48,64, 80 and 96 km/hour (miles/respectively). Rolling resistance was measured using the dynamics machine described in U.K. Pat. No. 1,392,033. These measurements were made at speeds of 20,40,60 and 80 km/hour/respectively.

Figure 2:
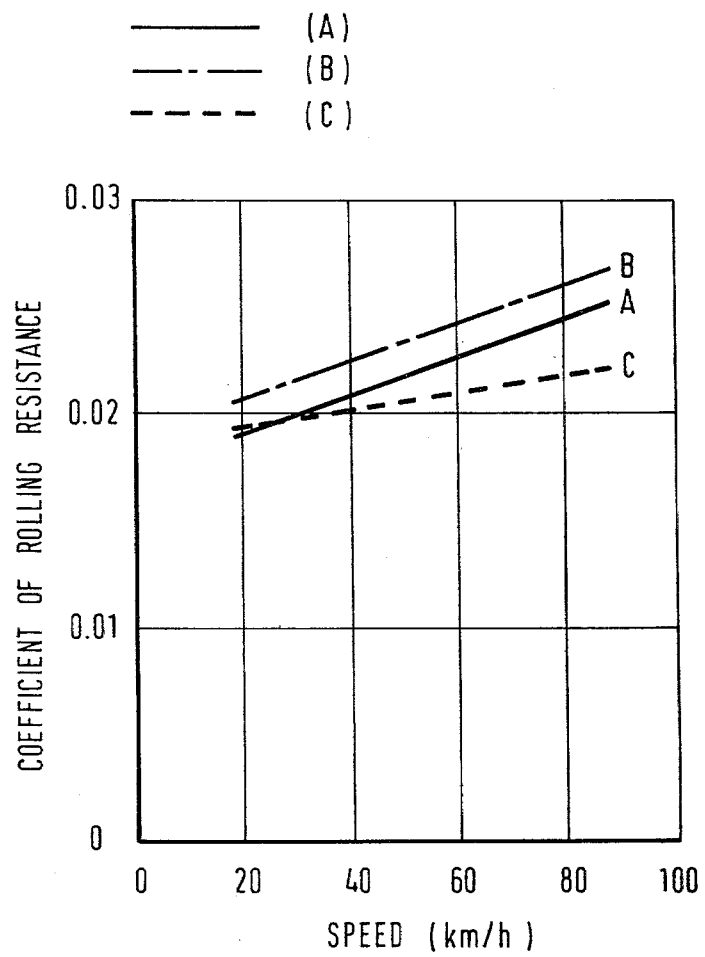
FIG. 2 is a graph showing the rolling resistance characteristics of tires having the tread composition of the following Examples 2, 3, and 4.

The results obtained from these tests are shown graphically in FIGS. 1 and 2 of the accompanying drawings.

In each of FIGS. 1 and 2 the results obtained using the tread compositions of Examples 2, 3 and 4 are referred to respectively by the letter of their constituent copolymer, that is by A, B or C.

Having now described my invention, what I claim is:

1. A tire comprising sidewalls, beads, and a tread, whose tread composition having improved wet grip and rolling resistance is formed of an elastomer composition containing as the elastomer a styrene-butadiene copolymer or a styrene-isoprene copolymer, the unvulcanized polymer forming the elastomer having a glass transition temperature of above about minus 50° C. to about minus 20° C., and said vulcanized tread composition having a rebound resilience of about 55% to about 95% measured using the Dunlop Pendulum at 50° C., according to B.S. 903/1950.

2. A tire according to claim 1, in which said glass transition temperature is in the range from minus 45° C. to minus 20° C.

3. A tire according to claim 2, in which said glass transition temperature is in the range from minus 40° C. to minus 25° C.

4. A tire according to claim 1, in which said rebound resilience is 60% or more.

5. A tire according to claim 4, in which said rebound resilience is in the range from 60% to 70%.

6. A tire according to claim 1, in which said copolymer has a styrene content of not more than 40% by weight of the copolymer.

7. A tire according to claim 6, in which said copolymer has a styrene content in the range from 20% to 40% by weight of the copolymer.

8. A tire according to claim 1, in which said copolymer is a styrene-butadiene copolymer and from 50% to 80% of the butadiene has polymerised at the butadiene 1,2 position.

9. A tire according to claim 8, in which from 60% to 75% of the butadiene has polymerised at the butadiene 1,2 position.

10. A tire according to claim 6, in which said copolymer has styrene blocks at the ends of its molecules.

11. A tire according to claim 6, in which said copolymer is a styrene-butadiene copolymer and has butadiene blocks at the ends of its molecules.

12. A tire according to claim 1, in which said copolymer is a styrene-butadiene copolymer having a styrene content in the range from 20% to 25% and a butadiene content correspondingly in the range from 80% to 75% by weight, a molecular weight in the range 400,000 to 500,000, a glass transition temperature in the range from minus 30° C. to minus 40° C., and in which from 60% to 75% by weight of the butadiene has polymerised at the butadiene 1,2 position.

* * * * *

UNITED STATES PATENT AND TRADEMARK OFFICE
CERTIFICATE OF CORRECTION

PATENT NO. : 4,334,567
DATED : June 15, 1982
INVENTOR(S) : Robert BOND

It is certified that error appears in the above-identified patent and that said Letters Patent are hereby corrected as shown below:

Column 3, line 6, for the quantities of Diglyme, the values should read: -- 1.4  1.4  1.4  1.26 --;

line 25, after "GPC," insert -- (gel permeation chromotography) --;

line 39, "0.140" should read -- 1.4 --;

line 48, "0.140" should read -- 1.4 --;

line 59, cancel "GPC";

line 65, "0.126" should read -- 1.26 --;

Column 5, line 41, the term $"(E"/E*)^2"$ should read $--(E"/E*^2)--$; and

Column 6, line 14, cancel "(miles/respectively)".

*Signed and Sealed this*

*Twenty-first* Day of *December 1982*

[SEAL]

Attest:

GERALD J. MOSSINGHOFF

*Attesting Officer*  *Commissioner of Patents and Trademarks*